United States Patent [19]

Westberg et al.

[11] 3,920,479

[45] Nov. 18, 1975

[54] ELECTRODES FOR STORAGE BATTERIES

[75] Inventors: Erik Westberg, Lidingo; John Andersson, Nol; Erik Sundberg, Stockholm, all of Sweden

[73] Assignee: Aktiebolaget Tudor, Stockholm, Sweden

[22] Filed: Dec. 26, 1973

[21] Appl. No.: 427,546

[30] Foreign Application Priority Data

Dec. 4, 1972 Sweden............................ 15732/72

[52] U.S. Cl. .................... 136/148; 136/43; 136/147
[51] Int. Cl.².......................................... H01M 3/00
[58] Field of Search......... 136/147, 148, 143, 36–65; 117/126 GB

[56] References Cited
UNITED STATES PATENTS 1,243,371  10/1917  Williard ............................... 136/54
2,343,970  3/1944   Galloway ........................ 136/147 X
3,081,368  3/1963   Wünsche .............................. 136/43
3,429,752  2/1969   Sundberg ........................ 136/148 X
3,725,130  4/1973   Andersson ...................... 136/147 X Primary Examiner—John H. Mack
Assistant Examiner—C. F. Lefevour
Attorney, Agent, or Firm—Burns, Doane, Swecker & Mathis

[57] ABSTRACT

A method of fabricating and a sheath for the active material surrounded conductive rods of a lead-acid storage battery of the liquid electrolyte type in which a tubular sheath composed of fibers has short lengths of the end portions mechanically bonded by application of a thermoplastic material in a molten liquid form.

5 Claims, 5 Drawing Figures

ELECTRODES FOR STORAGE BATTERIES

The present invention concerns electrodes for storage batteries. More specifically, the invention relates to so-called tube electrodes that are used primarily in lead storage batteries. Such tube electrodes comprise a centrally disposed conductor around which there is active material that is surrounded by a tubular sheath of electrolyte resistant, porous material. The electrodes of the invention are characterized in that a short length of the end portion of the tubular sheath is reinforced with a thermoplastic material.

The electrode sheaths intended for lead storage batteries can be prepared in various ways. Originally these sheaths were made of slit hard rubber. All such sheaths of the modern type have the common characteristic that they include at least one layer of fibrous material. The sheath may consist solely of this fibrous material, or of such material in combination with something else. It is well known, for example, that a tubular sheath can be made that consists of a woven or braided tube of glass fibers on the outside of which there is another sheath of perforated plastic foil such as shown in U.S. Pat. No. 3,429,752. Sheaths can also be made of a plurality of flat fabrics joined together with a number of parallel lines, whereby the individual tubular sheaths are developed and the sheath is considered to be coherent. Such coherent individual sheaths can also be made in the form of a double woven material. U.S. Pat. Nos. 3,725,130; 3,694,265; and 3,265,535 also disclose prior electrode and sheath constructions as generally referred to above.

In the fabrication of the sheaths, a hollow tube is prepared from starting material that has a substantially greater length than that of the finished tube. It follows therefore that the tubular material is cut into desired lengths determined by the height of the tube plate. The ends of the cut yarns can shift or pull out and thus allow the active material to fall out of the sheath. Such active material can cause a short circuit in the cell thereby reducing the battery capacity and its life. In attempting to eliminate this problem, hard, sharp edges must be avoided since such protrusions can damage the separators and also rub through to contact the adjacent plate of opposite polarity.

A major object of the present invention is to provide a novel sheath which has a short length near the cut end portion mechanically bonded by use of a thermoplastic material that is applied in a molten form and allowed to harden to thereby provide a securing of the cut end fibers on the sheath and a structure which will not cause a short circuit within the cell and resists the loss of active material.

Another object is to provide a novel method for fabrication of an electrode sheath by the manufacture of a continuous sleeve which is cut at predetermined lengths with the end portions at each end of the sheath treated by a molten thermoplastic material, such as an olefin.

These and other objects of the invention will become more fully apparent from the claims, and from the description as it proceeds in connection with the appended drawings wherein:

Figure 1:
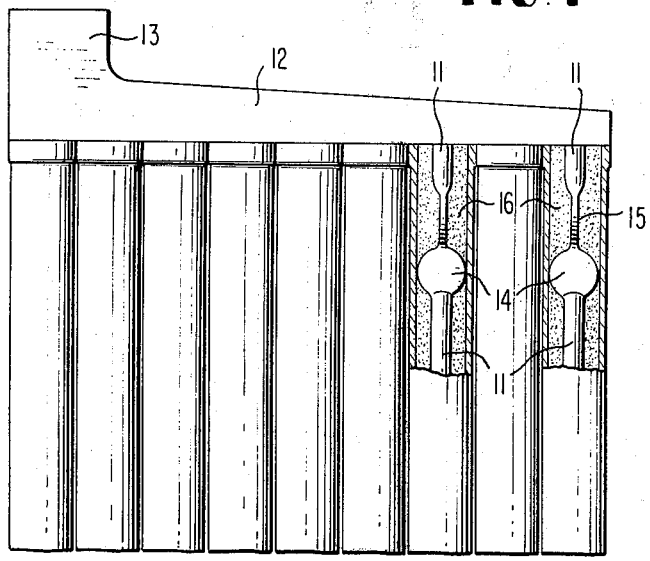
FIG. 1 is a view in elevation of a typical battery electrode having parallel tubes with two of the tube covers broken away to show the interior construction.

Referring now to the drawings, the battery electrode illustrated in FIG. 1 conventionally comprises parallel rods 11 of conductive material joined at the top by a transverse strip 12, and at the bottom by a similar transverse strip not shown. Transverse strip 12 has an upper extension 13 which is used to electrically connect several electrodes in a battery together. Rods 11 may be provided with conventional centering devices such as flattened regions 14 and 15 that are at right angles to each other. The active material 16 surrounds the conductive rods and is in turn surrounded by sheath 17.

Figure 2:
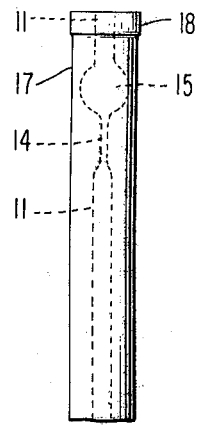
FIG. 2 shows a section of the tube end.

As shown in FIG. 2, the end portion 18 of the sheath 17 may have a slightly enlarged diameter due to the application of the thermoplastic material in accordance with the present invention. The length of the application of the thermoplastic material is kept quite short, usually only a fraction of a centimeter.

Figure 3:
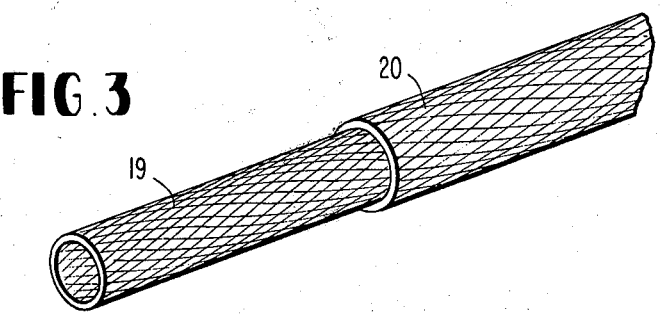
FIG. 3 is a pictorial view of a sheath that is formed of two independent tubes, one inside the other.

As shown in FIG. 3, the sheath may comprise two concentric tubes 19 and 20, each of which is a coherent structure, or alternatively, the sheath may be a single tube of woven or braided fibers of acid resistant yarn. Such tubes can also be made of the so-called unwoven textile where it is customary to start with two flat fabrics joined together with a number of parallel lines, whereby the individual tubular sheaths are developed. In most manufacturing processes, the tubular members are formed into continuous lengths of material which must be cut to the desired length for a particular tube plate during the fabrication of the electrode.

After the tubular material is cut to the correct length to serve as a sheath, the tubes may be inserted over the conductive member whereafter the active material is inserted. The bottom of the sheath is suitably closed by use of a plug.

In accordance with the present invention, it is desirable that the ends of the sheath be treated where they have been cut to avoid damage either during the filling operation or after the battery is placed in use. Because of differing requirements for different electrodes in different types of batteries, it is desirable to be able to form the sheaths from detached individual tubes or a plurality of coherent tubes. In some instances, it is not necessary that all individual tubes required for an electrode sheath be coherent. Regardless of the type of tube, the tube ends should be treated in accordance with the present invention so that detached tubes may be joined to form a coherent sheath suitable for a particular electrode plate.

Figure 4:
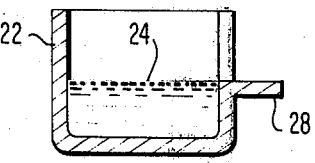
FIG. 4 is a view illustrating the application of the thermoplastic material to the ends of the tubes forming the sheath.

Referring now to FIG. 4, a heated, cup-shaped container 22 having a reservoir of molten thermoplastic material 24 may be provided to allow the end of a sheath 17 to be dipped into container 22 for applying the thermoplastic material. The level of the melt will control the length 18 of the end portion of the sheath 17 that is treated. The depth of the melt can be easily controlled as by means of a spout 28 which allows for overflow, and the melt can be replaced after each dip to assure a minimum effective amount. While this procedure is quite simple, unwanted additives such as antioxidants are required, and the vapors are sometimes objectionable to employees, as is the case of the use of additives in a solvent. Where solvents are used, additional adverse factors include health hazards and the risk of fire. Latex emulsions may also be used as the thermoplastic material, but cost becomes a major disadvantage. Olefins such as polyethylene and polypropylene are therefore preferred.

Figure 5:
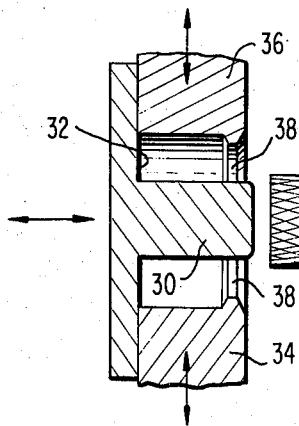
FIG. 5 is a diagrammatic view of apparatus adapted for simultaneously treating opposite ends of the sheath with thermoplastic material in accordance with the present invention.
Figure 5:
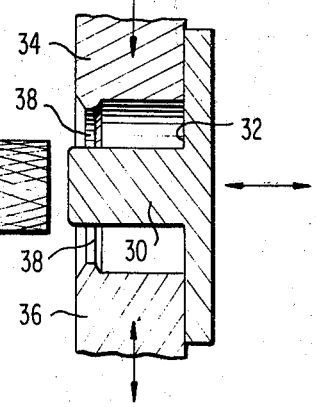

FIG. 5 shows a further embodiment where better control is maintained over the precise amount of thermoplastic material that is applied. The tube material, after being cut into the desired lengths to serve as a sheath 17, is placed in a form that defines the final dimensions of the sheath, whereafter molten thermoplastic material is injected or otherwise delivered to the end portion. The sheath 17 may be introduced over a stud 30 which fits tightly against the inside sheath wall and the sheath pushed to rear wall 32. Two movable parts 34 and 36, each having a ridge 38, close together about the sheath 17 after it has been set on stud 30 to form a cavity or ring surrounding a short length, less than about a centimeter and preferably one-quarter to one-half centimeter. Molten plastic material is introduced in any convenient manner as for example with injection molding equipment well known to those skilled in this art. By this procedure, the length of thermoplastic material 18 is controlled by the location of ridge 38 and the outside diameter of the thermoplastic material can be controlled by the space between the movable parts 34 and 36 and the outside of the sheath 17.

The thermoplastic material may also be applied to the cut end of sheath 17 as a solid. One satisfactory procedure is to preheat the tube and apply powdered thermoplastic material to the tube as by directing the tube end down into a fluidized bed of such material. Alternatively, the powdered thermoplastic material may be applied by electrostatic attraction. In either event, the sheath end portion is subsequently heated sufficiently to melt the thermoplastic material and provide the mechanical bonding of the fiber end portions.

A still further procedure for applying the thermoplastic material to the end of sheath 17 is by inserting strips of a plastic foil around the inside or outside of the end portion of sheath 17. The end portion of tube 17 with the strips of plastic foil is then inserted over a tool or stud 30, such as shown in FIG. 5, to obtain better contact between the thermoplastic material and the fibrous material. Thereafter, sufficient heat is applied to melt the thermoplastic material. By this procedure, the precise amount of thermoplastic material that is applied at the end portion of each sheath can be more precisely controlled than with the other procedures.

With respect to the embodiment shown in FIG. 5, by making the left-hand unit movable toward and away from the right-hand unit, which may be part of an injection molding machine, it is possible to simultaneously treat both ends of the sheath. In such a case, the two injectors opposite each other would work on its respective tube end and special arrangements for holding the sheath in place after being located on stud 30 are avoided.

After sheath 17 has been cut to the correct length and the ends treated, they may be then set on a grid of conductive rods 11 (see FIG. 1), and the active material placed in the space surrounding rod 11 and inside the sheath. Thereafter, the bottom of the sheath 17 is suitably closed by conventional techniques such as the use of a plug.

The active material 16 in the tube sheath 17 often becomes harder than the material in the separators or partitions that separate the electrodes. In many applications where the battery is used in a mobile unit, the positive electrodes, the separators, and the negative electrodes are somewhat movable with reference to each other. To avoid damage caused by this relative movement, rubbing between the sheath 17 and the separator can be reduced by making the thermoplastic coating 18 to have an external diameter that is somewhat greater than the diameter of the remainder portion of the sheath. By this technique, the direct contact between the sheath and the separator partition is avoided except at the upper and lower ends of the sheath where the thermoplastic material contacts the separator. Since the thermoplastic material is somewhat softer than the active material, the likelihood of damage to the separator partition is reduced to thereby also reduce the likelihood of premature failure of the battery for this reason.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to embraced therein.

What is claimed and intended to be covered by Letters Patent is:

1. The method of forming an insulating sheath for an active material surrounded conductive rod of a lead-acid battery of the liquid electrolyte type comprising the steps of:
   a. forming a tubular member of fibrous material resistant to attack by said electrolyte;
   b. cutting said tubular member into lengths that are suitable as an electrode sheath;
   c. applying a thermoplastic material in a solid state along a short length less than about a centimeter at an end portion of said sheath where the tubular member was cut;
   d. heating said end portion to an extent sufficient to cause said thermoplastic material to bond with said fibrous material and thereby form a mechanical bonding of the loose end fibers on said sheath; and
   e. thereafter placing said tubular member over said conductive rod and filling said tubular member with active material.

2. The method as defined in claim 1 comprising the further step of expanding a cut end of the tubular member to its desired final size and shape at the time the molten thermoplastic material is applied.

3. The method as defined in claim 1 wherein the thermoplastic material is applied to the tube in the form of a powder.

4. The method as defined in claim 1 wherein the thermoplastic material is applied in the form of a strip.

5. The method as defined in claim 1 wherein the thermoplastic material is applied simultaneously to both ends of the sheath.

* * * * *